United States Patent
Klumpp et al.

(10) Patent No.: US 9,227,321 B2
(45) Date of Patent: Jan. 5, 2016

(54) METHOD AND DEVICE FOR CONTROLLING A MANIPULATOR

(75) Inventors: Simon Klumpp, Neuhausen (DE); Günter Schreiber, Derching (DE)

(73) Assignee: KUKA Roboter GmbH, Augsburg (DE)

( * ) Notice: Subject to any disclaimer, the term of this patent is extended or adjusted under 35 U.S.C. 154(b) by 221 days.

(21) Appl. No.: 13/515,619

(22) PCT Filed: Dec. 8, 2010

(86) PCT No.: PCT/EP2010/007472
§ 371 (c)(1), (2), (4) Date: Jul. 26, 2012

(87) PCT Pub. No.: WO2011/082755
PCT Pub. Date: Jul. 14, 2011

(65) Prior Publication Data
US 2012/0283875 A1 Nov. 8, 2012

(30) Foreign Application Priority Data

Dec. 17, 2009 (DE) .......................... 10 2009 058 607

(51) Int. Cl.
| | |
|---|---|
| *G05B 15/00* | (2006.01) |
| *G05B 19/00* | (2006.01) |
| *B25J 9/16* | (2006.01) |

(52) U.S. Cl.
CPC ..... *B25J 9/1648* (2013.01); *G05B 2219/39355* (2013.01); *G05B 2219/41387* (2013.01)

(58) Field of Classification Search
USPC ............ 700/258, 260, 261, 262; 901/2, 8, 33, 901/34
See application file for complete search history.

(56) References Cited

U.S. PATENT DOCUMENTS

| | | | | |
|---|---|---|---|---|
| 4,715,773 A | * | 12/1987 | Parker et al. | ................... 414/730 |
| 4,791,588 A | * | 12/1988 | Onda et al. | ..................... 700/260 |

(Continued)

FOREIGN PATENT DOCUMENTS

| | | |
|---|---|---|
| DE | 199 30 087 A1 | 1/2001 |
| DE | 102 49 786 A1 | 5/2004 |

(Continued)

OTHER PUBLICATIONS

European Patent Office; Search Report in International Patent Application No. PCT/EP2010/007472 dated Jun. 1, 2011; 4 pages.

(Continued)

*Primary Examiner* — Khoi Tran
*Assistant Examiner* — Jorge Peche
(74) *Attorney, Agent, or Firm* — Wood, Herron & Evans, LLP

(57) ABSTRACT

A method for controlling a manipulator includes determining by a control device one or more contact force values between the manipulator and a first workpiece. Each of the contact force values is based on an actual driving force of the manipulator and a drive force according to a dynamic model of the manipulator. The method also includes at least one of a) measuring in multiple stages an orientation and location of the first workpiece based on at least one of the one or more determined contact force values or b) joining a second workpiece and the first workpiece under a compliant regulation, where a joining state of the first and second workpieces is monitored based on at least one of an end pose of the manipulator obtained under the compliant regulation, a speed of a temporal change of the manipulator, or at least one of the one or more determined contact force values.

15 Claims, 5 Drawing Sheets

(56) References Cited

U.S. PATENT DOCUMENTS

| | | | |
|---|---|---|---|
| 4,855,923 A * | 8/1989 | Fullmer | 700/108 |
| 4,860,215 A * | 8/1989 | Seraji | 700/260 |
| 5,077,941 A * | 1/1992 | Whitney | 451/5 |
| 5,129,044 A * | 7/1992 | Kashiwagi et al. | 700/251 |
| 5,261,768 A * | 11/1993 | Loucks et al. | 409/80 |
| 5,590,244 A * | 12/1996 | Nakata et al. | 700/260 |
| 6,294,890 B1 * | 9/2001 | Shimada et al. | 318/570 |
| 6,330,764 B1 * | 12/2001 | Klosterman | 49/375 |
| 6,522,415 B1 * | 2/2003 | Magnussen | 356/614 |
| 7,303,031 B2 * | 12/2007 | Maslov et al. | 180/8.1 |
| 7,508,155 B2 * | 3/2009 | Sato et al. | 318/646 |
| 7,650,263 B2 * | 1/2010 | Boyd et al. | 703/2 |
| 8,182,433 B2 * | 5/2012 | Leo et al. | 600/587 |
| 8,328,725 B2 * | 12/2012 | Anthony et al. | 600/459 |
| 2001/0040439 A1 * | 11/2001 | Kato et al. | 318/432 |
| 2004/0007106 A1 * | 1/2004 | Kuwahara et al. | 83/13 |
| 2005/0113971 A1 * | 5/2005 | Zhang et al. | 700/245 |
| 2005/0159840 A1 * | 7/2005 | Lin et al. | 700/245 |
| 2007/0073442 A1 * | 3/2007 | Aghili | 700/245 |
| 2007/0210740 A1 * | 9/2007 | Sato et al. | 318/646 |
| 2008/0077361 A1 * | 3/2008 | Boyd et al. | 702/189 |
| 2008/0188985 A1 * | 8/2008 | Sakano | 700/260 |
| 2009/0305535 A1 * | 12/2009 | Schmitz | 439/137 |
| 2010/0168919 A1 * | 7/2010 | Okamoto | 700/275 |

FOREIGN PATENT DOCUMENTS

| | | |
|---|---|---|
| DE | 10 2007 060 682 A1 | 6/2009 |
| DE | 10 2009 018 403 A1 | 10/2010 |
| EP | 0 901 054 A1 | 3/1999 |
| EP | 0901054 * | 3/1999 |
| EP | 0 901 054 A1 * | 10/1999 |
| EP | 1 422 020 A1 | 5/2004 |
| EP | 1 950 010 A2 | 7/2008 |
| EP | 2 011 610 A2 | 1/2009 |
| EP | 2 045 049 A2 | 4/2009 |
| JP | 2003-236785 | 8/2003 |

OTHER PUBLICATIONS

Chinese Patent Office; Office Action in Chinese Patent Application No. 201080057807.9 dated Apr. 3, 2014; 5 pages.

* cited by examiner

Key: Modell: model; Kontakt: Contact; Soll: target; geschätzt: estimated; teach: learned; füg: join Key: Modell: model; Kontakt: contact; Soll: target

METHOD AND DEVICE FOR CONTROLLING A MANIPULATOR

TECHNICAL FIELD

The present invention concerns a method and a device for controlling a manipulator, in particular a robot, and a retaining tool for a manipulator, used according to the invention.

BACKGROUND

Industrial robots are to be used for, among other things, the joining of components. For this, position tolerances, in particular, of workpieces that have been supplied, which are to be joined to the workpieces that are held by the robot, complicate the automation.

Aside from structural compliances, such as a flexible robot, or a flexible end effector connection, for example by means of a so-called "remote center of compliance" ("RCC"), diverse theoretic solution approaches for such so-called "pin/hole" problems have been proposed, e.g. the detection of contact forces by means of additional contact sensors, and the determination of the correct joining trajectory based on said contact forces. These approaches, however, have rarely been put into practice due to a variety of problems.

The objective of the present invention is to improve the control of a manipulator.

SUMMARY

A method or, respectively, a device according to the present invention is provided, in particular, for a single or multiple, e.g. six-axis or redundant robot, such as, for example, an industrial robot or a lightweight construction robot, such as the lightweight construction robot "LBR" of the applicant.

For this, a control can also be understood to mean regulation, i.e. the specification of control dimensions based on given guidance, and detected actual, dimensions.

According to a first aspect of the present invention, a contact force is detected, based on the actual driving force and driving forces of a dynamic model of the manipulator.

For the purpose of condensing the depiction, for the present, a torque, i.e. a non-parallel pair of forces, is referred to in general as a force, such that, for example, the detection of a contact force is to be understood as the detection of force and/or torque components along one or more axes, in particular Cartesian axes, or articulation axes, and a driving torque, such as that of an electric motor, is referred to as a driving force.

Actual driving forces can be detected directly, by means of force sensors on a single axle or actuator of the manipulator, and/or indirectly, e.g. based on power consumption or output of a actuator.

A dynamic model describes in general the connection between kinematic dimensions, in particular articulation coordinates q, speeds dq/dt and accelerations $d^2q/dt^2$, and forces, in particular drive, weight and frictional forces, such that $$Md^2q/dt^2 + h(q, dq/dt) = \tau_{modell}$$

with the mass matrix M and the generalized forces h. If the kinematic dimensions such as weight and frictional forces are known, then differences result between the drive forces $\tau_{modell}$ of the model and the actual drive forces $\tau$, aside from model and measurement errors, in particular from contact forces not provided in the model, which can be determined therefore due to the difference between the actual measured drive forces and the model drive forces, such that:

$$F_{kontakt} = F(\tau_{modell} - \tau)$$

This detection of contact forces between the manipulator and a workpiece, based on the actual drive force and drive forces of a dynamic model, eliminates additional force sensors and enables, in an advantageous manner, a measurement that will be explained later, a joining monitoring, and/or a switching to a compliant regulation.

According to one aspect of this first aspect of the present invention, one or more poses, in particular for the measuring or joining of workpieces, is initiated with the rigidly regulated manipulator. A rigid regulation is understood, in particular, to mean a position regulation, for example a proportional, differential and/or integral regulation, of a Cartesian position of a reference point such as the TCPs, for example, or in the articulation coordinates of the manipulator.

For this, one or more contact forces are detected continuously, or at discreet points in time, which act on the manipulator when contact is made with a supplied workpiece.

If a detected contact force exceeds a given value, which in particular can also be zero, if applicable, taking into consideration the corresponding tolerances, then, according to the invention, the switching to a compliant regulation is carried out. Ideally, a switching of this type is executed within a maximum of 3 milliseconds after the establishment of contact, preferably within a maximum of 1.5 milliseconds.

A compliant regulation, or a switching to said regulation, can be obtained, for example, by means of reducing the regulation coefficients of a P or PD regulation, and/or the elimination of an integral portion of a PID regulation, such that the manipulator does not exert a high level of drive force even with larger regulation deviations, or tracking errors, respectively, between the target and the actual pose. In addition, or alternatively, a drive force can be limited to a, preferably low, maximum value, such that in turn, no high level of drive forces can be generated, even with larger tracking errors. In a preferred embodiment, a compliant regulation is designed as a so-called impedance regulation, in particular, a force based impedance regulation. In general, a compliant regulation, in contrast to a rigid regulation, indicates, in the present case in particular, any regulation in which the drive forces of the manipulator are generated such that with contact to a workpiece, neither said workpiece, nor the manipulator are damaged, even if a given target pose demands a more extensive engagement by the manipulator with the workpiece.

In a preferred embodiment, the workpiece is then joined using the compliant regulation and/or its position is measured based on the detected contact force in a multi-stage procedure. In this manner, it is possible, in particular in connection with a lightweight construction robot, having limited inertia, to reduce the cycle times in an advantageous manner, as this then allows for a measurement or joining pose to be initiated, by means of a rigid regulation, quickly and precisely, without the risk of damaging the workpiece or manipulator in the course of measuring or joining the workpiece, because when contact is initiated, a switching over to the compliant regulation occurs immediately.

According to another aspect of this first aspect of the present invention, a workpiece is joined while subject to a compliant regulation, and a joined state of the workpiece based on a detected contact force is monitored. By means of monitoring a contact force, a snapping in place of a workpiece, joined while subject to an elastic or plastic deformation, can occur, due to a significant increase or decrease of said force, and a correct joining procedure can thereby be ascertained. In this manner, a contact force is then increased in the course of the joining by means of an elastic deformation, in particular in opposition to the direction of the joining. When the workpiece then settles, for example, after overcoming a bead, this force decreases significantly. Likewise, the state of tension of a screw can be checked and determined by a torque, in the form of a contact force applied to the manipulator, detected according to the first aspect, which is exerted by the inserted screw, as to whether or not the screw has been tightened too tightly, its head has been twisted off, or the screw is too loose, due to a settling of the threading.

Additionally, or alternatively, a joining state of the workpiece can be monitored, based on an end pose of the manipulator obtained under the compliant regulation. It is possible, by means of a compliant regulation, to obtain that the manipulator, independently of having reached a target joining end pose, no longer moves the workpiece in the joining direction. If the end pose obtained through the compliant regulation is compared with the target joining end pose, which can be determined by means of instructing a robot, it is possible to determine whether the joining procedure has been correctly executed.

Furthermore, additionally or alternatively, a joining state of the workpiece can be monitored based on the temporal change to the pose of the manipulator resulting under the compliant regulation as well, in particular, based on the speed of said change. If a speed of the TCP, or the workpiece guided by the manipulator, respectively, falls below a limit value, for example, it is possible to determine that the workpiece is correctly joined.

If this is not the case, for example, because the workpiece that is to be joined is impeded by an interfering contour, then a joining strategy, in particular a joining position, can be changed, in that, for example, it is attempted to insert a bolt from a new starting position, shifted from the original starting joining position.

According to a preferred design, in the joining of a workpiece using a compliant regulation, both one or more target forces as well as one or more target movements are to be provided. If the compliant regulation is obtained, for example, by means of a force-based impedance regulation, in which the drive force $\tau$ is defined as $$\tau = J^T[c(x_{soll} - x) + F)]$$

by means of which the TCP is determined, as a result of the transported Jacobian matrix J in the space of the articulated coordinates, the rotational angle of an articulated arm robot, the projected spring tension of a virtual spring having the spring constant c, between a Cartesian target (soll) and actual (ist) position $x_{soll}$ or x, then the target movement, according to $$\tau = J^T[c(x_{soll} - x) + F]$$

can have a force defined in Cartesian space applied to it. This can occur selectively, preferably, depending on the already executed joining procedure, or the joining strategy for the respective workpiece, for example. The target force can be given as constant, inclining, alternating or swelling, and in particular, sinusoidal, for example, in order to overcome, by way of example, stick/slip phenomena, ridges, or small elastic tolerances that occur in the joining.

In particular, in order to join workpieces to one another, it is necessary to recognize a position, i.e. a location and/or orientation of a workpiece, such as a base body, for example, in relation to the manipulator, that a workpiece that is to be joined, such as a bolt, a clamp, or similar items, is in. Thus, according to a second aspect of the present invention, a position of a workpiece is measured by means of the manipulator in a multi-stage procedure, whereby, preferably this second aspect is combined with the first aspect, explained above.

According to this second aspect, positions of preferably at least two non-aligned contours, in particular, edges, of the workpiece are determined, in that poses of the manipulator, and thereby the contact force applied to said robot, are detected. If a contact force increases significantly when a pose is assumed, resulting from a feeler of the manipulator coming into contact with a contour of the workpiece, then the contact position can be determined from the associated pose of the manipulator.

If, in this manner, the position of the workpiece in relation to the manipulator is roughly known, then reference points of the workpiece can be assigned, which can be defined, for example, by recesses, in particular, holes. When a feeler makes contact with a reference point, such as, by inserting a feeler in a recess, for example, then, due to an increase in the corresponding contact force, which acts against further movement of the feeler, the position of the reference point can be determined. Based on these reference points, a workpiece coordination system can be determined, which enables, in contrast to the rough orientation of referenced contours, a precise determination of, for example, joining positions and suchlike.

Preferably, a reference point is approached by a feeler in a perturbative manner, i.e. the manipulator moves the feeler to the immediate vicinity of the position, estimated in advance, of the reference point, along a predetermined tracking path, preferably along a single plane, which is oriented substantially tangential to the contour of the workpiece at the reference point, and in this manner, searches the region for the previously estimated position of the reference point, until, due to the contact force resulting from the slipping of the feeler into a hole, it is prevented from moving further. In doing so, the advantage is demonstrated, when according to the first aspect, the position, estimated in advance, of the reference point is approached according to a compliant regulation.

In particular, in order to ensure the slipping of the feeler into a reference point, which defines the recess, the manipulator can exert a standard force on the workpiece, perpendicular to the plane explained above, said plane being oriented substantially tangential to the contour of the workpiece at the reference point. In a preferred design of the present invention, a feeler and a recess for defining a reference point are constructed such that the feeler centers itself when slipping into the recess. By way of example, the feeler can be a cone shaped point, and the recess can have a circular perimeter.

The contacting of contours for determining the rough position of the workpiece, in order to be able to reliably make contact with reference points, and the contacting of reference points can take place successively such that, first, all pre-defined contours are contacted, before, subsequently, the reference points, the approximate positions of which are known, are approached. At the same time, these steps can be carried out alternatingly, such that first, the respective contours, preferably in the vicinity of the reference points, are contacted, and subsequently the reference points, the approximate locations of which with respect to said contour, are known, before subsequently, other contours are contacted in turn, in order to determine the approximate positions of other reference points, and to reliably contact said reference points subsequently.

A third aspect of the present invention concerns the joining of a workpiece by means of the manipulator. This can advantageously be combined with the first and/or second aspects explained above.

According to the third aspect, the manipulator holds a workpiece that is to be joined, first in at least two, preferably non-collinear, in particular substantially perpendicular to one another oriented, force-contacts, when it places said workpiece in a joining starting position. For this, a force-contact indicates a contact between the workpiece and the manipulator, in particular a retaining tool, with which the manipulator exerts a retaining force on the workpiece, oriented in a manner corresponding to the direction of the respective retaining force.

By way of example, a first force-contact can be realized in a force-locking manner by means of an electromagnet, which attracts the workpiece when actuated. A second force-contact can, for example, be realized in an interlocking manner by means of a lip, on which the workpiece is supported.

After being placed in a joining position, the manipulator moves the workpiece in the direction of the joining to a joining end position. According to the invention, one of the force-contacts, for example, the first one, is opened by means of a force-contact established by an electromagnet when its supporting or retaining function is taken over by a workpiece, with which the workpiece held by the manipulator is to be joined.

This enables a reorientation of the manipulator that is holding the workpiece, such that a conflict with contours of a workpiece, with which the workpiece held by the manipulator is to be joined, can be prevented.

In particular, in order to enable shorter cycle times for a measurement and a subsequent joining of workpieces according to at least one of the aforementioned aspects, a retaining tool according to the invention for a manipulator exhibits a retaining region for holding, in particular in a force-locking or form-locking manner, a workpiece, and also a feeler for making contact with a workpiece. The retaining region can, for example, depict, with one or more electromagnets and/or lips, the first or second force-contact described above, having feelers, preferably having cone shaped ends for self-centering in a recess under a compliant regulation. Preferably, the feeler extends at a substantially right angle to, or in the opposite direction of the position or retaining region of the retaining tool, in order to prevent conflicts between a workpiece and the retaining region during the measuring, or the feeler during joining. A feeler as set forth in the present invention can be a bolt, a pin, or similar item, designed, in particular, to be rigidly connected to a retaining tool of the manipulator, or as an integral part of said tool, which is preferably rotationally symmetrical, and/or having a point.

BRIEF DESCRIPTION OF THE DRAWINGS

Further advantages and characteristics can be derived from the dependent Claims and the embodiment examples. For this, the drawings show, in part, schematically:

DETAILED DESCRIPTION

Figure 1:
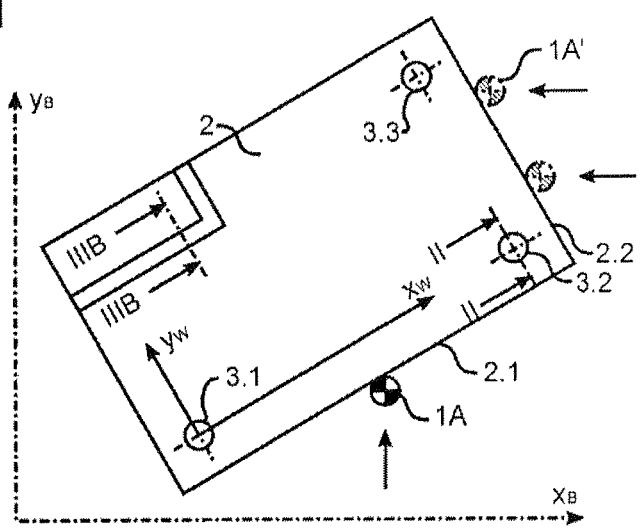
FIG. 1: A top view of a workpiece being measured in accordance with a method according to one design of the present invention.
Figure 2:
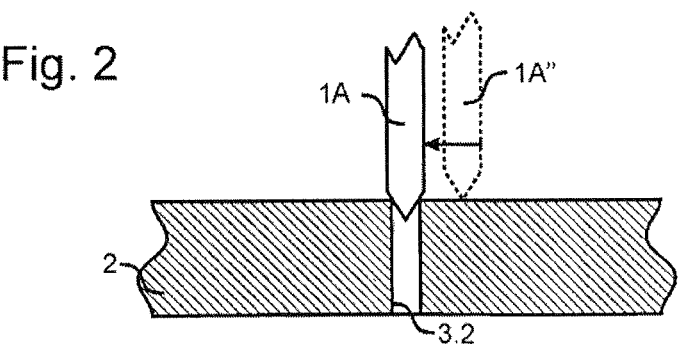
FIG. 2: A cut along the line II-II in FIG. 1.
Figure 5:
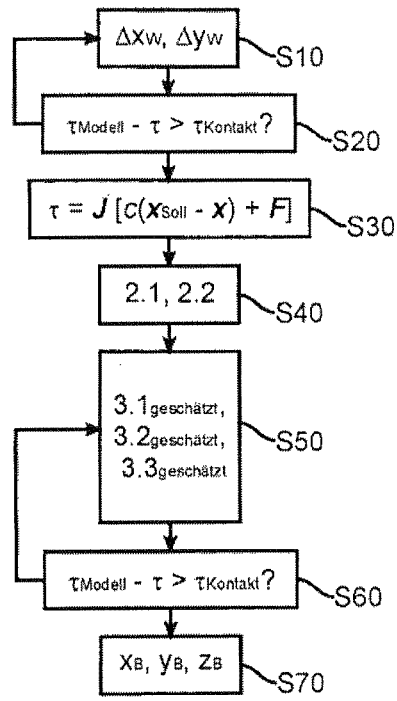
FIG. 5: The sequence of the measurement show in FIGS. 1, 2.

Based on FIGS. 1, 2, and 5, a multi-stage measurement of a position of a workpiece 2 is explained, on the basis of contact forces detected in accordance with a method according to one design of the present invention.

For this, the workpiece 2, by way of example, an instrument panel, is first positioned after delivery within certain tolerances somewhere in the working region of a lightweight construction robot, wherein, only a part of a retaining tool 1 is shown in the figures; in FIGS. 1 and 2, only a cylindrical feeler 1A with a cone-shaped point (cf. FIG. 3A) configured at a right angle to a retaining region 1.1, 1.2 with which in the following, with respect to FIGS. 3 and 4, engagement will be made. A base coordination system B of the robot is defined in the work region, the x and y axes of which are indicated in FIG. 1. By means of the, explained below in increasingly greater detail, use of a retaining tool 1 according to the invention, having a retaining region 1.1, 1.2 (cf. FIG. 3B) and a feeler 1A (cf. FIG. 3A), a tool change between the measurement and joining can be avoided, and thus, the cycle period can be reduced.

In a first stage of a multi-stage measurement, the robot moves its feeler 1A, regulated by a rigid PID, along the x or y axis of the coordinate system B, until said feeler successively contacts the edges 2.1, 2.2 of the workpiece 2 at the points indicated in FIG. 1 (cf. FIG. 5, step S10). In doing so, a control device (not shown) compares the drive torque r measured on the robot with theoretical drive torques $\tau_{modell}$, that are theoretically necessary (FIG. 5: "S20"), according to a dynamic, contact-free model, for generating the determined movement of the robot. If the difference between these drive torques, in particular in terms of the amount of torque, exceeds a predetermined limit value $\tau_{kontakt}$, it is determined therefrom that the feeler 1A has made contact with an edge 2.1 or 2.2 of the workpiece 2. As a result, a switching to a compliant force-based impedance regulation is carried out immediately, within 1 millisecond (FIG. 5: "S30"), in which the feeler 1A is "pulled" by a virtual spring towards a target position $x_{soll}$.

By making contact with the two un-aligned edges 2.1, 2.2, the position of the workpiece 2 in the coordinate system B of the robot can already be roughly determined (FIG. 5: "S40"). For this, the switching to the compliant regulation ensures that the robot can quickly approach the contours, first regulated rigidly, without damaging the workpiece or robot through contact.

In a second stage, three non-collinear reference holes 3.1-3.3 in the workpiece 2 are approached by the feeler. For this, the robot moves a feeler 1A into positions 3.1.sub.geschatzt and 3.2$_{geschätzt}$ [translator's note: geschätzt: estimated] (FIG. 5: "S50"), that based on the position of the workpiece 2, roughly known from the first stage, have been estimated, whereby the feeler 1A is moved in a perturbative manner, e.g. meandering or in parallel tracks, about the estimated positions (cf. FIG. 2). For this, the tip of the feeler is pressed against the workpiece with a standard force perpendicular to the surface plane of said workpiece, while, in particular in this plane (left-right in FIG. 2) the robot is regulated in a compliant manner.

As soon as the feeler 1A moves from a position lying adjacent to a reference hole, indicated in FIG. 2 with a broken line and labeled 1A", to the reference point position defined by the reference hole 3, it slides into said hole with the standard force exerted thereby, and centers itself, based on its cone-shaped tip and the compliant regulation in the surface plane, in this hole, as is depicted in FIG. 2 in the expansion.

A further movement of the feeler 1A by the compliantly regulated robot, which continues to attempt to follow the tracking path, acts against a significantly greater contact force to the feeler 1A sitting in the hole 3.2 at this point, which is detected in step S60 (FIG. 5). In this manner, the positions of the reference holes 3.1-3.3 can be determined quickly, precisely, and reliably. From this, in particular, the position of a workpiece associated coordinate system W in relation to the robot coordinate system B can be determined.

At this point, by way of example, a clamp 4 (cf. FIG. 3) is applied to the workpiece at the upper left edge in FIG. 1, whereby the multi-stage measurement, by means of switching to a compliant regulation, can also be eliminated. This joining procedure shall be explained using FIGS. 3 and 6.

Figure 3A:
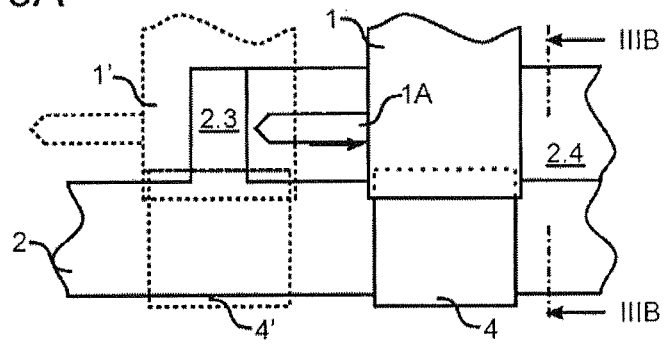
FIG. 3A: A side view from the upper left perspective in FIG. 1, during the joining of a workpiece in accordance with a method according to one design of the present invention.
Figure 6:
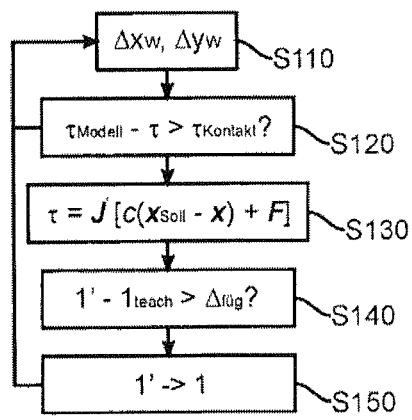
FIG. 6: The sequence of the change of a joining position shown in FIG. 3A.

A first joining starting position is indicated by a broken line in FIG. 3A, at which point the robot first attaches the clamp 4, and attempts to push said clamp onto the workpiece 2 in the joining direction (index ' in FIG. 3A; step S110 in FIG. 6). In doing so, the clamp 4 collides, however, with a flank 2.3 of the workpiece 2 (cf. FIG. 1 as well). As described previously, when contact is made, a switching to a compliant regulation occurs (FIG. 6: "S120," "S130"), in which a target movement $x_{soll}$ superimposes a given target force F, in particular, a constant force $F_{xy}$ in the joining axis, and a force $F_z$, having a sinusoidal curve perpendicular to the joining axis and plane, in order to make a pushing onto the edge easier.

Due to the compliant regulation, no damage occurs to the workpiece or robot, despite the collision with the flank 2.3. Instead, as soon as the tool 1 of the robot, having the clamp 4 held by it, no longer moves due to the resistance, the end pose of the robot reached thereby (indicated with a broken line in FIG. 3A) is compared with a learned end position, in which the clamp 4 is correctly applied (FIG. 6: S140). In the present case, due to the significant difference, the control device recognizes that the clamp 4 is not correctly applied. As a result, the joining position is changed (FIG. 6: S150), in that the robot places the clamp 4, shifted to one side, on the workpiece again, as is indicated in the expansion in FIGS. 3A-3C. This procedure is repeated until the robot can apply the clamp 4 without a collision, or a predetermined number of erroneous attempts has been obtained.

Figure 3B:
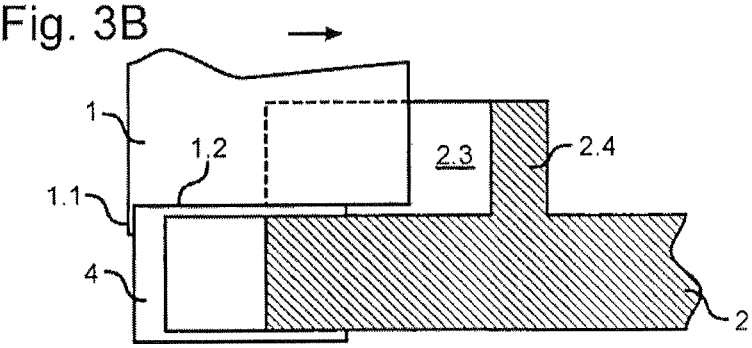
FIG. 3B: A cut along the line IIIB-IIIB in FIG. 1, 3A, with a workpiece placed in the joining starting position.
Figure 3C:
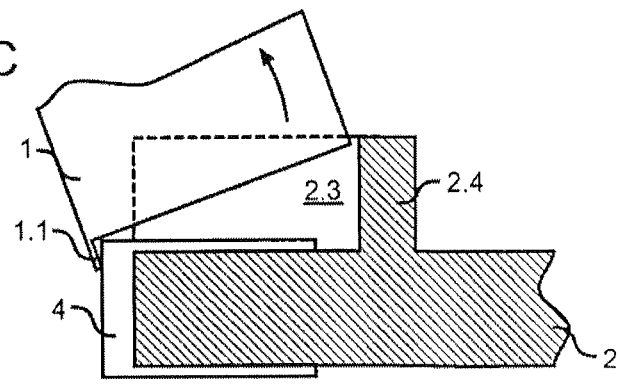
FIG. 3C: A view according to FIG. 3B with a workpiece in the joining starting position.

A successful joining procedure shall be explained based on the FIGS. 3B, 3C. For this, the robot places the workpiece, if applicable, after the erroneous attempts described above in reference to FIG. 3A, in a joining starting position, and pushes it lightly towards the workpiece 2 (FIG. 3B). In doing this, it holds the clamp 4, firstly, with a first force-contact in the vertical axis by means of an activated electromagnet 1.2, and at the same time, supports it with a second force-contact against a lip 1.1 of the tool 1, counter to the second force-contact acting against the application in the horizontal plane, in a form-locking manner.

In order to prevent a collision of the tool 1 with the flank 2.4 of the workpiece 2 during further joining, the control device releases the first force-contact while the tool is being applied, in that the electromagnet 1.2 is deactivated, which enables a re-orientation of the tool 1 (FIG. 3C) in relation to the partially applied clamp 4. In this manner, the robot can fully slide the clamp 4 with the tool lip 1.1 onto the workpiece 2.

Figure 7:
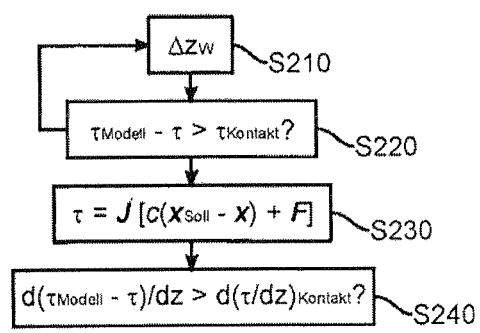
FIG. 7: The sequence of a joining shown in FIGS. 4A-4D.

Based on FIGS. 4 and 7, the inserting of another component, specifically an elastic plug 40, in a hole 20 is explained. One sees that the robot first moves the plug 40 in the vertical plane towards the hole 20 (step S210 in FIG. 7). If a given limit value, based on the difference between the measured contact force and the model drive torque contact force that has been detected, is exceeded, then the control device detects the contact with the workpiece (FIG. 7: "S220") and switches to a compliant regulation (FIG. 7: "S230"). Under this regulation, the plug is inserted further and the contact force is detected by means of the insertion advance z.

Figure 4A:
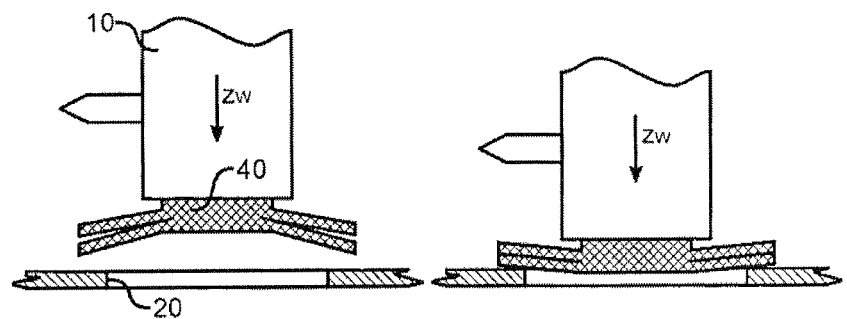
FIGS. 4A-4D: A side view during the joining of another workpiece in accordance with a method according to one design of the present invention.
Figure 4B:
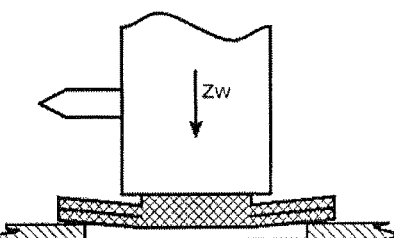
Figure 4C:
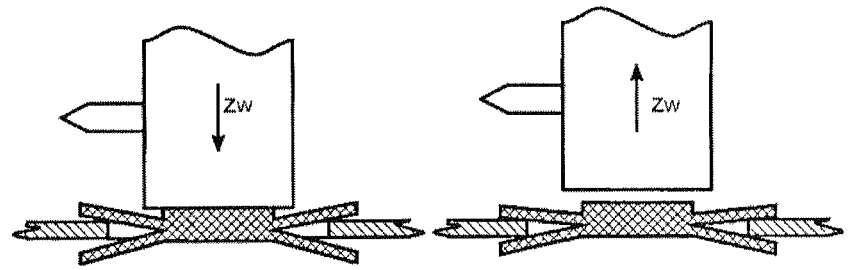
Figure 4D:
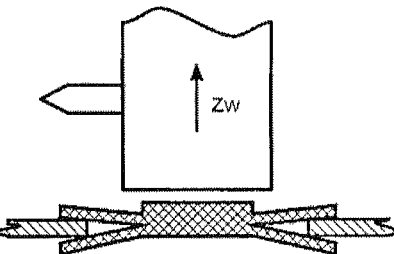

One sees in the image series, FIG. 4B→FIG. 4C, that the plug is deformed in an elastic manner thereby. As soon as its lower flank has fully passed through the hole 20, and returned elastically to its starting state, the contact force reduces, acting counter to the insertion.

This decrease in force is detected by the control device in a step S240 and it can, based on this, be checked, even in a compliant regulation, whether the plug 40 has been correctly inserted in the hole 20. Alternatively, or in addition, the end position of the robot obtained at a standstill can be compared with a previously learned end position, in order to check whether the plug 40 has been fully inserted in the hole 20.

In addition, or alternatively, a speed criteria can be used here. This is reasonable, in particular, if the end position in the direction of insertion is not precisely known, if for example, the position of the workpiece 20 varies, without its being measured, prior to the insertion. If, for example, the speed of the TCP, or the workpiece 40, respectively, drops for a given period of time below a predetermined limit value, then the control device can detect that the plug 40 cannot be further pushed into the hole. The end pose obtained in this manner is then detected and compared with a pose that has been saved when contact to the workpieces 20, 40 has been established, which can be determined by the increase in force detected thereby. If the difference between the two poses lies within a predetermined tolerance range, then the joining procedure is determined to be successful.

In an embodiment that is not shown, the lightweight construction robot inserts a bolt into a threading by means of a given target torque and/or a target advance. Here too, a contact force, e.g. a torque in the direction of turning, is detected and the insertion state is monitored on the basis of said contact force. If the robot has reached its learned position, and there is an excessive torque at this point, then the bolt has been turned too tightly. If, however, the torque is to little, the bolt is not securely tightened, because, for example, a nut has been displaced, or a bolt head has been twisted off.

In addition, or alternatively, the inserted screw can be turned further after being tightened to a defined torque, through a predetermined angle of, for example, 90°. After this turning, the detected torque for a correctly tightened screw must lie within a predetermined range.

REFERENCE SYMBOL LIST

1; 10 Retaining tool
1A Feeler
1.1 Lip (retaining region, form-locking force-contact)
1.2 Electromagnet (retaining region, force-locking force-contact)
2 Workpiece
2.1, 2.2 Edge (contour)
2.3, 2.4 Flank
3.1-3.3 Hole (reference point)
4 Clamp
20 Workpiece
40 Plug

The invention claimed is:

1. A method for controlling a manipulator, the method comprising:
    assuming a pose by the manipulator according to a rigid regulation;
    determining by a control device one or more contact force values between the manipulator and a first workpiece by comparing an actual driving force of the manipulator to a drive force according to a dynamic model of the manipulator;
    determining that one of the one or more determined contact force values exceeds a predetermined value;
    switching to a compliant regulation in response to determining that the one determined contact force value exceeds the predetermined value; and
    joining a second workpiece and the first workpiece under the compliant regulation, wherein a joining state of the first and second workpieces is monitored based on the one or more determined contact force values, and the second and first workpieces are joined using an elastic or plastic deformation.

2. The method according to claim 1, wherein switching to a compliant regulation if one of the one or more determined contact force values exceeds a predetermined value comprises:
    switching to the compliant regulation within a maximum of 3 milliseconds after a determination that the one of the one or more determined contact force values exceeds the predetermined value.

3. The method according to claim 1, wherein at least one target force as well as at least one target movement are predetermined in the compliant regulation for joining the first and second workpieces.

4. The method according to claim 1, further comprising:
    changing a joining strategy based on at least one of an end pose of the manipulator obtained under the compliant regulation, a speed of a temporal change of the manipulator, or at least one of the one or more determined contact force values.

5. The method according to claim 1, wherein joining a second workpiece and the first workpiece comprises:
    holding the second workpiece by the manipulator in at least two force-contacts;
    placing the second workpiece in a joining starting position; and
    moving the second workpiece into a joining end position while releasing at least one of the force-contacts.

6. The method according to claim 5, wherein moving the second workpiece into a joining end position while releasing at least one of the force-contacts comprises:
    retaining one of the force-contacts, wherein the retained force-contact holds the second workpiece in a form-locking manner.

7. The method of claim 1, wherein the driving force of the manipulator comprises a driving torque of the manipulator, and the drive force according to the dynamic model of the manipulator comprises a drive torque according to the dynamic model of the manipulator.

8. The method of claim 1, wherein the first workpiece comprises an aperture for receiving at least a portion of the second workpiece.

9. The method of claim 1, wherein the rigid regulation comprises a position regulation.

10. A control device for a manipulator, in particular a robot, the control device configured to:
    actuate the manipulator to assume a pose according to a rigid regulation;
    determine one or more contact force values between the manipulator and a first workpiece by comparing an actual driving force of the manipulator to a drive force according to a dynamic model of the manipulator;
    determine that one of the one or more determined contact force values exceeds a predetermined value;
    switch to a compliant regulation in response to determining that the one determined contact force value exceeds the predetermined value; and
    join a second workpiece and the first workpiece under the compliant regulation, wherein a joining state of the first and second workpieces is monitored based on the one or more determined contact force values, and the second and first workpieces are joined using an elastic or plastic deformation.

11. The control device of claim 10, wherein the first workpiece comprises an aperture for receiving at least a portion of the second workpiece.

12. The method of claim 10, wherein the rigid regulation comprises a position regulation.

13. A computer program product, comprising:
    a non-transitory computer readable medium; and
    program code stored on the computer readable medium that, when executed by one or more processors, causes the processors to:
        actuate the manipulator to assume a pose according to a rigid regulation;
        determine one or more contact force values between the manipulator and a first workpiece by comparing an actual driving force of the manipulator to a drive force according to a dynamic model of the manipulator;
        determine that one of the one or more determined contact force values exceeds a predetermined value;
        switch to a compliant regulation in response to determining that the one determined contact force value exceeds the predetermined value; and
        join a second workpiece and the first workpiece under the compliant regulation, wherein a joining state of the first and second workpieces is monitored based on the one or more determined contact force values, and the second and first workpieces are joined using an elastic or plastic deformation.

14. The computer program product of claim 13, wherein the first workpiece comprises an aperture for receiving at least a portion of the second workpiece.

15. The method of claim 13, wherein the rigid regulation comprises a position regulation.

* * * * *